United States Patent Office 2,975,151
Patented Mar. 14, 1961

2,975,151

VULCANIZATION OF LATEX WITH ORGANIC HYDROPEROXIDE

Walter S. Ropp, Wilmington, Del., assignor to Hercules Powder Company, Wilmington, Del., a corporation of Delaware No Drawing. Filed July 27, 1956, Ser. No. 600,415

8 Claims. (Cl. 260—29.7)

This invention relates to the art of vulcanizing rubber latex. More particularly, it relates to a process for vulcanizing rubber latex in the presence of an organic hydroperoxide as an essential vulcanizing agent.

Some vulcanized rubber articles such as gloves, toy balloons, and foam rubber are made directly from rubber latex. In addition to ease of production, an advantage in quality is obtained through elimination of the degrading effects caused by milling rubber during dry compounding. In some instances where vulcanized articles are made directly from latex, it is desirable to eliminate the vulcanization step normally required after the article has been formed. In such cases there is used a latex in which the rubber particles have been vulcanized.

Up to the present time, the rubber industry has depended almost entirely upon sulfur or sulfur-bearing materials as vulcanizing agents not only for vulcanizing rubber in the dry state but also for vulcanizing rubber as it exists in latex. Processes are known in which vulcanization of latex is accomplished by introducing sulfur, or sulfur-bearing compounds, and other curatives into the latex and then heating to effect vulcanization without coagulation.

There are certain disadvantages inherent in the vulcanization of latex with sulfur or sulfur-bearing compounds, for example, the vulcanizing agent and other curatives added to the latex must pass through the water phase and into the rubber particles. The relative insolubility of such ingredients in both water and in rubber makes the vulcanization of latex a slow process, and the relatively high specific gravity of the sulfur and other curatives necessitates constant agitation to prevent settling.

There have recently been proposed processes for the vulcanization of latex which utilize an organic peroxide as an essential vulcanizing agent. These processes in general provide excellent results and possess several advantages over the vulcanization of latex by means of sulfur or sulfur-bearing compounds. In particular, the vulcanization process using the organic peroxides is simpler and provides a product which is considerably less opaque. However, a minor disadvantage of vulcanization utilizing an organic peroxide as the essential vulcanizing agent is that relatively high vulcanization temperatures are required.

In accordance with the present invention, it has been found that organic hydroperoxides in which an oxygen of the hydroperoxide is attached to a tertiary carbon atom are effective agents for vulcanizing latex and are capable of effecting vulcanization at a temperature appreciably lower than the previously proposed organic peroxides. This discovery is surprising because whereas the organic peroxides had been known to be vulcanizing agents for dry rubber, the organic hydroperoxides in general had been found to be ineffective as vulcanizing agents for dry rubber. In fact, organic hydroperoxides have been disclosed in the prior art as retarders in dry rubber vulcanization.

Based on the aforesaid discovery, the present invention provides a process for the vulcanization of natural and synthetic rubber latices which comprises incorporating in the latex a minor amount of an organic hydroperoxide in which an oxygen of the hydroperoxide group is attached to a tertiary carbon atom and heating said latex to a temperature ranging from about 200° to 350° F., preferably from about 200° to 300° F., to effect vulcanization of the rubber particles in situ.

As an additional but optional embodiment of the invention, there may be incorporated in the latex either before or after vulcanization a minor amount of a compound having the formula:

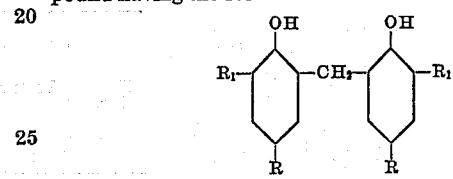

where R is an alkyl group of 1 to 3 carbon atoms and $R_1$ is a tertiary alkyl group of 4 to 8 carbon atoms, to improve the resistance of the vulcanized latex to deterioration upon aging in oxygen and/or light.

The following examples are presented to illustrate specific embodiments of the invention and to show the effectiveness of the specified organic hydroperoxides as vulcanizing agents in the process of the invention. All parts and percentages are by weight unless otherwise specified.

EXAMPLE 1

An aqueous dispersion of cumene hydroperoxide was prepared by mixing 0.8 part of aqueous 30% KOH and 12.2 parts of water in a mixing vessel. In a separate vessel there was mixed 23.2 parts of cumene hydroperoxide (56.4% active hydroperoxide) and 0.9 part of oleic acid. The two mixeures were combined and formed into an emulsion by vigorous agitation.

Sufficient of the above emulsion was added to 100 parts of natural rubber latex, which had been diluted to 50% solids with ammonia water, to provide a concentration of 1% hydroperoxide based on the latex solids. Dispersion of the hydroperoxide emulsion into the latex was accomplished by light stirring.

The latex was next sealed in a pressure vessel where it was heated to a temperature of 250° F. for 1 hour. On removal of the latex from the vessel, only very slight coagulation was visible. In order to observe the effects of the vulcanization, approximately 30 ml. of the vulcanized product was poured into a flat, square, ceramic tile vessel, approximately 4 inches square. The latex in the vessel was then allowed to air dry for 3 hours, then oven dried for 8 hours at 125° F. The ceramic vessel was next removed from the oven, soaked with its contents in water for 30 minutes, and a film of vulcanized rubber, approximately 40 to 50 mils in thickness, was stripped off.

Standard type "C" dumbbell specimens were cut from the film and tested by standard ASTM methods for modulus tensile strength and maximum elongation. These tests were made on the Instron tensile tester using a cross head speed of 20 inches per minute and an initial grip separation of 1.0 inch.

An experiment in which no hydroperoxide was used was included for comparative purposes. The following physical data on the films was obtained:

Table I

| Expt. No. | Percent Hydro-peroxide | Modulus (Tensile Stress) At Indicated Percent Elongation (p.s.i.) | | | | | Maximum | |
|---|---|---|---|---|---|---|---|---|
| | | 100 | 200 | 300 | 500 | 700 | Tensile Stress (p.s.i.) | Elongation (percent) |
| 1 | 0 | 50 | 67 | 67 | 71 | 108 | 650 | 1,020 |
| 2 | 1 | 47 | 69 | 78 | 92 | 179 | 1,145 | 1,015 |

An additional portion of each film was given a 36 hour exposure on the Fade-Ometer and another portion of each film was exposed for 120 hours in an oxygen bomb at 70° C. at 300 p.s.i. oxygen pressure. Included for comparison are two films prepared from a latex to which had been added 1%, based on the latex solids, of 2,2'-methylene bis(4-methyl-6-t-butylphenol) as an antioxidant. In one case the antioxidant was added prior to vulcanization and in the other case, after vulcanization. The results obtained in these tests were as follows:

Table II

| Expt. No. | Percent Hydro-peroxide | Modulus (Tensile Stress) At Indicated Percent Elongation (p.s.i.) | | | | | Maximum | |
|---|---|---|---|---|---|---|---|---|
| | | 100 | 200 | 300 | 500 | 700 | Tensile Stress (p.s.i.) | Elongation (percent) |
| AFTER FADE-OMETER EXPOSURE | | | | | | | | |
| 1 | 0 | (³) | (³) | (³) | (³) | (³) | (³) | (³) |
| 2 | 1 | (³) | (³) | (³) | (³) | (³) | (³) | (³) |
| 3 | ¹1 | 39 | 53 | 59 | 82 | 136 | 240 | 860 |
| 4 | ²1 | 48 | 65 | 80 | 122 | 220 | 470 | 870 |
| AFTER OXYGEN BOMB EXPOSURE | | | | | | | | |
| 5 | 0 | (⁴) | (⁴) | (⁴) | (⁴) | (⁴) | (⁴) | (⁴) |
| 6 | 1 | (⁴) | (⁴) | (⁴) | (⁴) | (⁴) | (⁴) | (⁴) |
| 7 | ¹1 | 54 | 59 | 64 | 84 | 168 | 198 | 780 |
| 8 | ²1 | 64 | 79 | 89 | 130 | | 303 | 710 |

¹ Also contained 1% antioxidant added after vulcanization.
² Also contained 1% antioxidant added before vulcanization.
³ Unable to test.
⁴ Unable to test—melted.

The resuls tabulated above show dramatically that greatly improved properties are obtained by the employment of cumene hydroperoxide as a vulcanizing agent. They show further that although the vulcanized films obtained from the vulcanized latex are poor in their resistance to deterioration under the influence of oxygen and light, these deficiencies can be offset to a great degree by the inclusion of an antioxidant of the formula previously given.

EXAMPLE 2

In this example other hydroperoxides, including tertiary butyl hydroperoxide and p-diisopropylbenzene dihydroperoxide, are employed as vulcanizing agents for natural rubber latex. There were first prepared emulsions of the hydroperoxides, an emulsion of tertiary butyl hydroperoxide being prepared by the axact procedure described previously for the emulsification of cumene hydroperoxide. A dispersion of p-diisopropylbenzene dihydroperoxide was prepared by a slightly different procedure since this hydroperoxide is a solid material. In making the latter dispersion, 2.5 parts of the hydroperoxide was dissolved in 30 parts of acetone and 1.4 parts of oleic acid was added to the solution. In a separate vessel, 1.2 parts of aqueous 30% KOH was mixed with 30 parts of water and the two solutions were simply stirred together resulting in an aqueous dispersion containing 3.02% p-diisopropylbenzene dihydroperoxide.

The vulcanization procedure and the method of casting films were the same as described in Example 1 except that the latex (60% solids) was not diluted with ammonia water and the portion of latex into which the p-diisopropylbenzene dihydroperoxide was incorporated was stabilized by the addition of 1% casein based on the latex solids.

The results obtained by physical testing of the films were as follows:

Table III

| Expt. No. | Percent Hydroperoxide | Modulus (Tensile Stress) At Indicated Percent Elongation (p.s.i.) | | | | | Maximum | |
|---|---|---|---|---|---|---|---|---|
| | | 100 | 200 | 300 | 500 | 700 | Tensile Stress (p.s.i.) | Elongation (percent) |
| 1 | 0 | 64 | 70 | 70 | 75 | 176 | 1,890 | 1,270 |
| 2 | 1% t-butyl hydroperoxide. | 74 | 99 | 131 | 197 | 710 | 2,775 | 970 |
| 3 | 1% p-diisopropylbenzene hydroperoxide.¹ | 69 | 93 | 121 | 184 | 608 | 2,728 | 975 |

¹ Also contains 1% casein.

The results again show that the use of the hydroperoxides as vulcanizing agents resulted in films of improved physical properties.

EXAMPLE 3

In this example p-diisopropylbenzene dihydroperoxide is employed as a vulcanizing agent for a latex containing 36% by weight of a rubbery butadiene-acrylonitrile copolymer prepared by the copolymerization of 70 parts of butadiene and 30 parts of acrylonitrile. The emulsion of p-diisopropylbenzene dihydroperoxide, prepared as in Example 1, was added to the latex in an amount to provide a concentration of 1% hydroperoxide based on the weight of solids in the latex. There was also added 1% casein as a stabilizer. Vulcanization was effected by heating in a closed vessel to 250° F. for one hour as in Example 1.

Films of the vulcanized latex were cast on glass plates with an 0.015 inch casting knife. The films were then air dried for 2 days, removed from the plates, dried 1 hour at 160° F. and 20 minutes at 250° F.

Physical property data on the films were determined as before in comparison to a film prepared without the hydroperoxide. These data are as follows:

Table IV

| Expt. No. | Percent Hydro-peroxide | Modulus (Tensile Stress) At Indicated Percent Elongation (p.s.i.) | | | | | Maximum | |
|---|---|---|---|---|---|---|---|---|
| | | 100 | 200 | 300 | 500 | 700 | Tensile Stress (p.s.i.) | Elongation (percent) |
| 1 | 0 | 153 | 139 | 125 | 110 | 104 | 153 | 2,042 |
| 2 | 1 | 163 | 170 | 176 | 197 | 231 | 520 | 1,254 |

Again, the improvement in physical properties which is gained by the use of the hydroperoxide as the vulcanizing agent is obvious.

The organic hydroperoxides which are useful in this invention are characterized by having an oxygen of the hydroperoxide group directly attached to a tertiary carbon atom. Many hydroperoxides of this class are known and are commercially available. Examples of such hydroperoxides are cumene hydroperoxide, p-methane hydroperoxide—which is a commercially available mixture of hydroperoxides prepared by oxidation of p-methane and characterized by the formula:

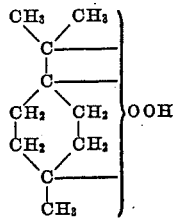

p-cymene hydroperoxide, t-butyl hydroperoxide, cyclohexylbenzene hydroperoxide, p-diisopropylbenzene hydroperoxide, p-diisopropylbenzene dihydroperoxide, 1-cyclohexyl hydroperoxide-1, and the like.

The quantity of hydroperoxide utilized in vulcanizing latex will depend to a great extent upon the conditions to be utilized during vulcanization. In general, the quantity may vary from 0.1% to 10% based on the weight of solids in the latex. The preferred amount is from about 0.25% to about 2.5%. The amount of hydroperoxide can also vary depending upon the type of latex and the properties desired in the final vulcanizate.

The examples have illustrated emulsification of the hydroperoxide in water prior to its dispersion in the latex. This is a procedure which assures uniform distribution of the hydroperoxide through the latex and which is advantageous for that reason. However, preliminary emulsification of the hydroperoxide is not necessary; an adequate degree of vulcanization can be achieved if the hydroperoxide is added to the latex in concentrated form or in solution in an organic solvent. In still another modification, dispersion of the hydroperoxide in the latex can be aided by the addition of other materials to effect the emulsification of the hydroperoxide directly in the latex. For instance, a quantity of hydroperoxide and a relatively small quantity of a fatty acid can be added to latex which has been stabilized with ammonia in known manner whereby an ammonium salt of the fatty acid is formed in situ and functions as an emulsifying agent for the hydroperoxide. In brief, the hydroperoxide can be dispersed in the latex by any of several methods which will be apparent to those skilled in the art.

When it is desired to emulsify the hydroperoxide perior to incorporation in the latex, conventional emulsifying agents and emulsifying apparatus can be used. Satisfactory emulsions can be prepared containing from about 0 to 45% hydroperoxide by means of alkali metal soaps of fatty acids, ammonia or amine soaps of fatty acids, as well as many other agents. In this manner, a stable emulsion can be obtained by vigorous agitation.

Vulcanization of the latex following incorporation of the hydroperoxide is accomplished simply by heating the latex to a temperature ranging from about 200 to 350° F. The optimum vulcanization temperature is from about 200 to 300° F. Within this preferred range, vulcanization is substantially complete within a period of from about 90 to 30 minutes.

The process of this invention has been found applicable for the vulcanization of latices of both natural and synthetic rubbers. Generically, the latices which can be vulcanized are classed as latices of rubbery polymers of at least one compound selected from the group consisting of conjugated diolefins and chloroprene. This includes latices of natural rubber as well as latices of synthetic rubbery polymers such as polymerization products of butadiene and its derivatives and homologs, e.g., methyl butadiene, dimethyl butadiene, pentadiene, and chloroprene. This term also includes latices of rubbery copolymers of the conjugated diolefins with other unsaturated organic compounds such as acetylene, styrene, acrylonitrile, isobutylene, etc. The preferred latex is natural rubber latex.

Such latices are well known articles of commerce and can be vulcanized in the manner of the invention as they normally are sold or can be concentrated prior to vulcanization. Ordinarily, no difficulty is encountered due to premature coagulation of the latex. However, if desired, one or more of the commonly known latex stabilizers, such as soaps, sulfated vegetable oils, sulfated hydrocarbons, proteins, etc., can be added to the latex to prevent coagulation during vulcanization should any be encountered.

Although latex vulcanized according to this invention is generally characterized by excellent physical properties, it is sometimes deficient in resistance to deterioration by light or oxygen. This definiciency, however, can be overcome to a great extent by the addition prior to or after vulcanization of a minor amount, i.e., from about 0.01% to about 5% based on the weight of rubber solids, of an antioxidant as previouusly defined. The effect of such an antioxidant is illustrated in the examples.

What I claim and desire to protect by Letters Patent is:

1. A process for vulcanizing a latex selected from the group consisting of latices of natural rubber and a synthetic rubbery copolymer of butadiene and acrylonitrile which consists essentialy of the steps of incorporating in the latex from 0.1 to 10%, based on the weight of rubber solids in said latex, of an organic hydroperoxide having an oxygen of the hydroperoxide group directly attached to a tertiary carbon atom and heating said latex to a temperautre of 200–350° F. to effect vulcanization of rubbery particles in situ.

2. The process of claim 1 in which the organic hydroperoxide is cumene hydroperoxide.

3. The process of claim 1 in which the organic hydroperoxide is p-diisopropylbenzene dihydroperoxide.

4. The process of claim 1 in which the organic hydroperoxide is t-butyl hydroperoxide.

5. The process of claim 1 in which a minor amount within the range of 0.01 to 5% based on the weight of rubber solids of an antioxidant having the formula:

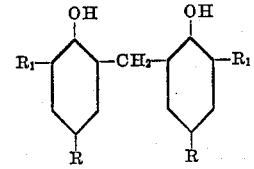

where R is an alkyl group of 1 to 3 carbon atoms and $R_1$ is a tertiary alkyl group of 4 to 8 carbon atoms is added to the latex prior to vulcanization.

6. The process of claim 1 in which a minor amount within the range of 0.01 to 5% based on the weight of rubber solids of an antioxidant having the formula:

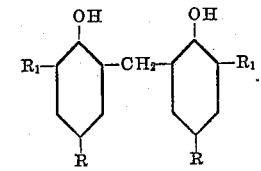

where R is an alkyl group of 1 to 3 carbon atoms and $R_1$ is a tertiary alkyl group of 4 to 8 carbon atoms is added subsequent to vulcanization.

7. The process of claim 1 in which the latex is of natural rubber.

8. The process of claim 1 in which the latex is that of a synthetic rubbery copolymer of butadiene and acrylonitrile.

References Cited in the file of this patent

UNITED STATES PATENTS

| | | |
|---|---|---|
| 2,430,864 | Farkas et al. | Nov. 18, 1947 |
| 2,538,355 | Davis et al. | Jan. 16, 1951 |
| 2,615,009 | St. John et al. | Oct. 21, 1952 |
| 2,628,214 | Pinkney et al. | Feb. 10, 1953 |
| 2,676,930 | McKay et al. | Apr. 27, 1954 |
| 2,686,165 | Fryling et al. | Aug. 10, 1954 |
| 2,725,414 | Bevilacqua | Nov. 29, 1955 |
| 2,775,578 | Fisher et al. | Dec. 25, 1956 |
| 2,776,295 | Wicklatz et al. | Jan. 1, 1957 |
| 2,802,891 | Field et al. | Aug. 13, 1957 |
| 2,868,859 | Stott | Jan. 13, 1959 |